Dec. 19, 1939. V. K. ZWORYKIN 2,183,634
RADIO COURSE INDICATOR
Filed Sept. 24, 1937 3 Sheets-Sheet 1
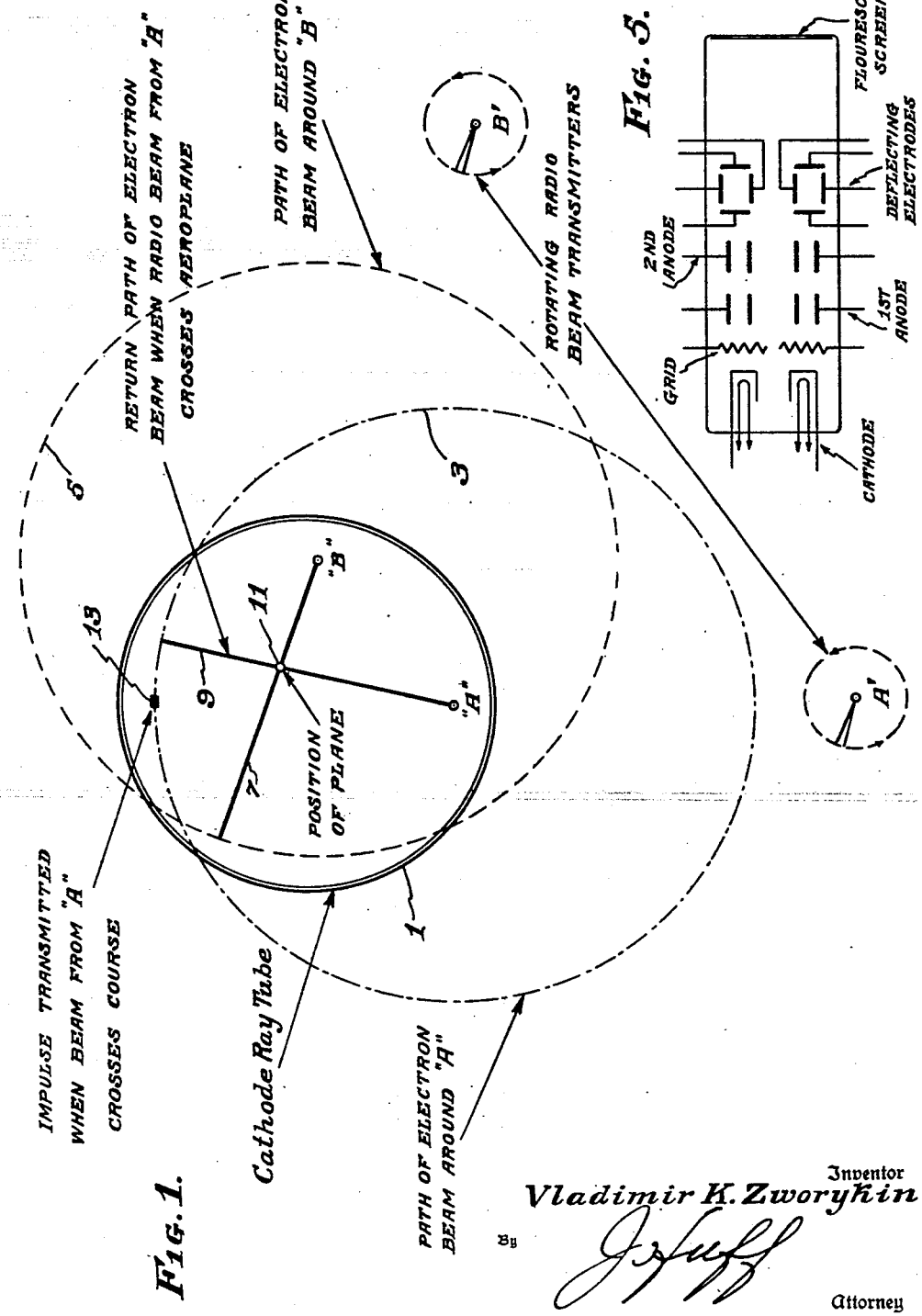
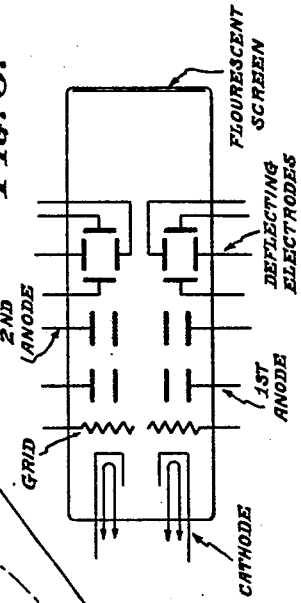
Inventor
Vladimir K. Zworykin
Attorney Dec. 19, 1939.  V. K. ZWORYKIN  2,183,634
RADIO COURSE INDICATOR
Filed Sept. 24, 1937  3 Sheets-Sheet 2
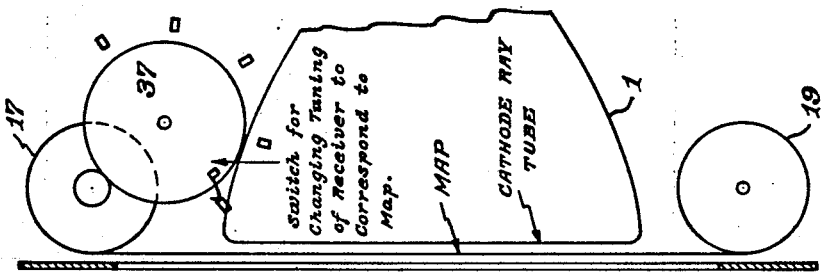
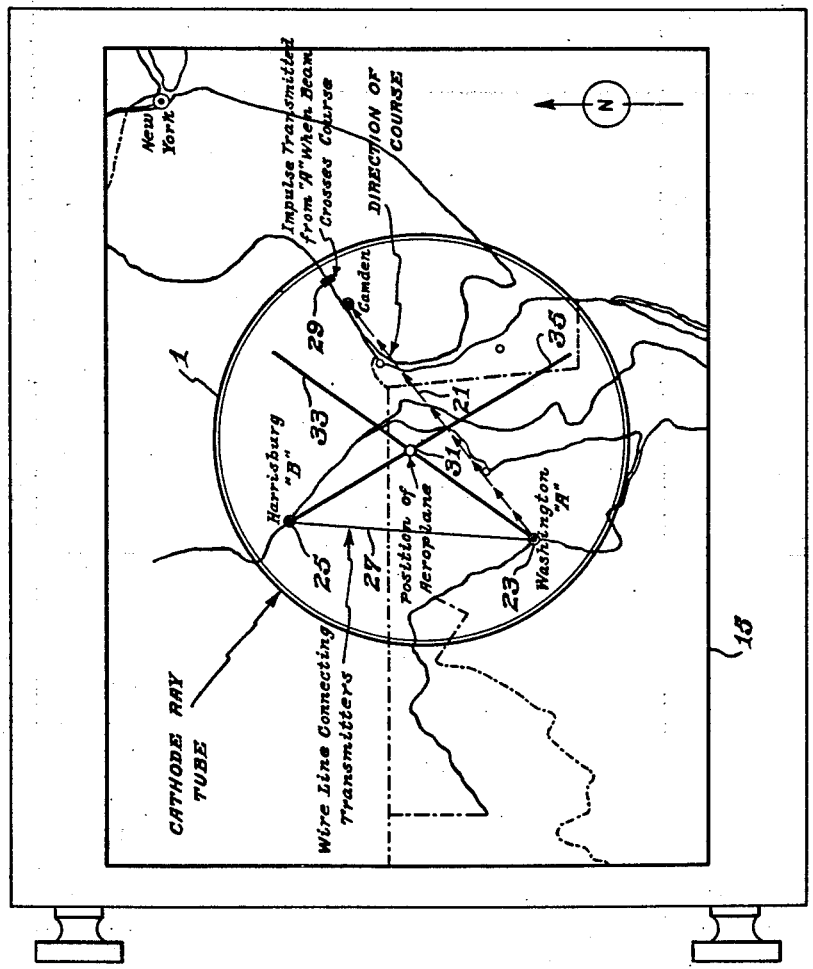
Inventor
Vladimir K. Zworykin
Attorney Dec. 19, 1939.    V. K. ZWORYKIN    2,183,634
RADIO COURSE INDICATOR
Filed Sept. 24, 1937    3 Sheets-Sheet 3
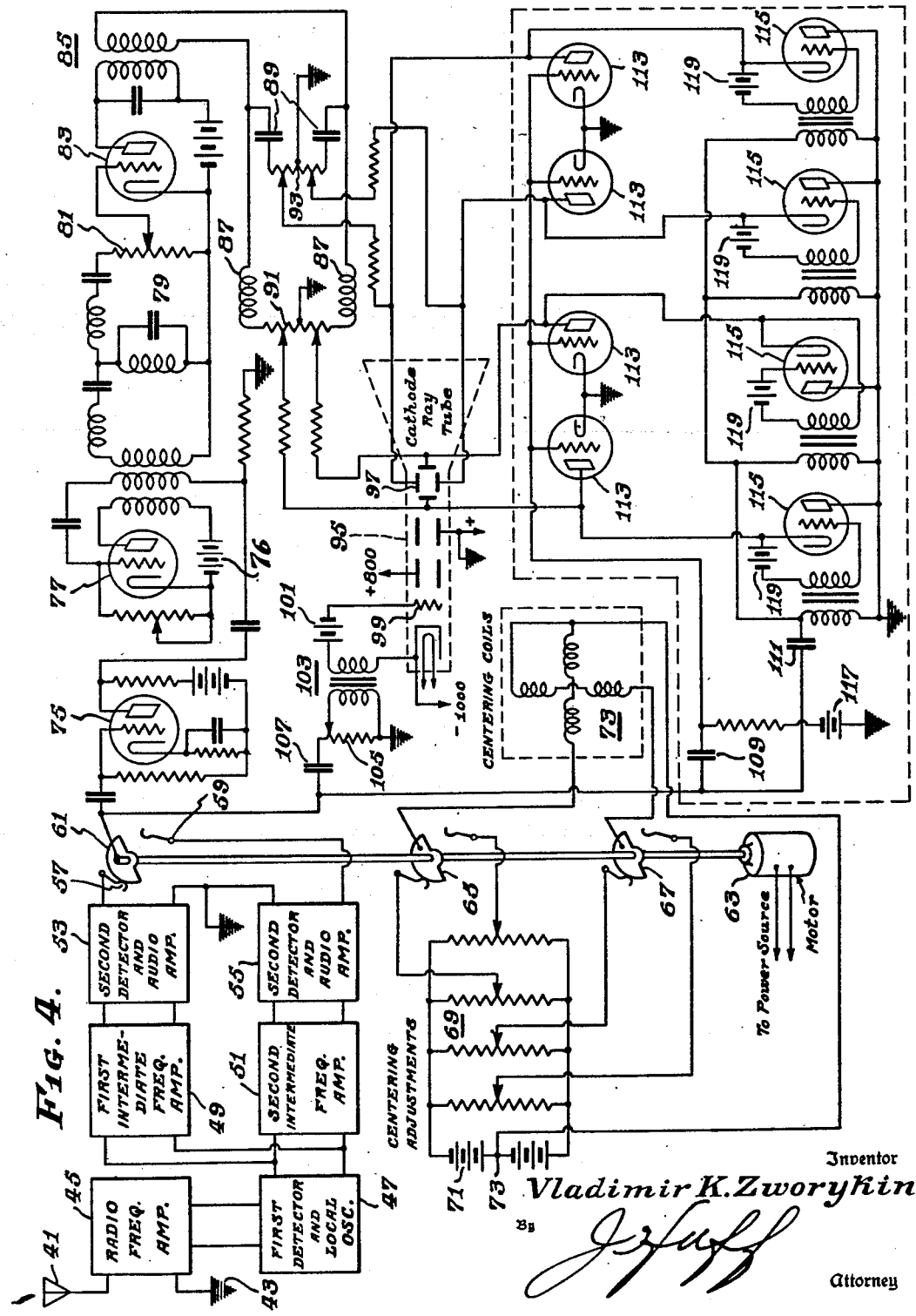
Inventor
Vladimir K. Zworykin
By
Attorney Patented Dec. 19, 1939

2,183,634

UNITED STATES PATENT OFFICE 2,183,634

RADIO COURSE INDICATOR

Vladimir K. Zworykin, Philadelphia, Pa., assignor to Radio Corporation of America, a corporation of Delaware Application September 24, 1937, Serial No. 165,454

13 Claims. (Cl. 250—11)

My invention relates to radio course indicators and especially to an indicator which continuously gives the position of a mobile vehicle on a map.

I am aware that it has been proposed to indicate positions of radio receivers by obtaining the bearing of the receiver with respect to two or more transmitters or vice versa. Although such positions are generally obtained by plotting the bearings on a map and observing the intersection of the bearing lines, mechanical means automatically operated for indicating the bearing lines have been proposed. Such means have the objectionable features of inertia, and complicated mechanical movements. My invention contemplates in its broader view an inertialess radio course indicator of the cathode ray type, which overcomes the said objectionable features.

One of the objects of my invention is to provide means for continuously indicating the course of a mobile vehicle.

Another object is to provide means for continuously indicating the position of an aircraft or the like on a map.

Another object is to provide means whereby a cathode ray indicates the radio course or position of an aircraft.

A further object is to provide means whereby a pair of rotating radio beam transmitters actuate a radio receiver including a cathode ray tube for indicating the intersection of the beams and therefore the position of the receiver with respect to the transmitters.

A still further object is to provide means whereby a radio receiver including a cathode ray tube indicates the position of the receiver with respect to a pair of radio beam transmitters and a desired radio course.

These and other objects of my invention will be set forth in the following specification which may be best understood by reference to the accompanying drawings in which Figure 1 is a diagram to illustrate the operation of my invention;

Figures 2 and 3 are plan and side views respectively of one embodiment of my invention;

Figure 4 is a schematic circuit diagram; and

Figure 5 is a schematic illustration of a cathode ray tube with a single fluorescent screen and dual electrodes for producing and controlling the rays.

A rotating radio beam may be radiated from a radio transmitter. The rotation of the beam may be effected by the actual rotation of the transmitting antenna and reflector, as described in Patent No. 894,318, which was issued to De Forest in 1908, or by rotation of the radio field as described, for example, in the copending application of David G. C. Luck, Serial No. 156,055, filed July 28, 1937, and entitled "Rotating radio beacon". The radio beacons in effect radiate a rotating radio beam; synchronizing and marking signals may be included in the broadcast carrier of the beacon.

If a pair of rotating beams and the broadcast carrier including synchronizing signals are radiated from suitably located transmitters, the paths of the beams will intersect as they rotate. If a receiver is moved in the portions of the field where the paths of the beams intersect, the intersection may be indicated and therefore the position of the receiver with respect to the transmitters. One method of such indication is illustrated diagrammatically in Fig. 1. If a cathode ray tube 1 is arranged with suitable centering means, a pair of electron guns, or a single gun and commutating means hereinafter described, the cathode ray may be focused on spots A and B. These spots correspond to the beam transmitters A' and B' described above, and are correspondingly located with respect to each other on the cathode ray screen.

The cathode ray or rays may be rotated about the centers A and B to thereby respectively follow the paths 3 and 5. The rotation about the centers A and B may be synchronized with the rotation of the radio beams by means of the synchronizing impulse modulating the broadcast carrier. In practice the beam is focused off the fluorescent screen of the tube 1, and biased to cut-off in the absence of a signal stronger than that of the fixed field, so that no indication is given until the transmitted rotating beam intersects or crosses the receiver. The ray then traces bearing lines 7, 9 in a manner which will be described hereinafter. The traces are preferably made at a frequency above the persistence of vision to avoid flickering. The intersection 11 of the lines 7, 9 indicates the position of the receiver with respect to the locations of the transmitters A' and B'. The transmission from the beacon A' corresponding to the point A can include reference marker 13 which may be transmitted on the broadcast carrier when the beam from A' crosses a desired course or corresponds to north.

Referring to Figs. 2 and 3 which show a practical application of my invention, a transparent map 15 is adjustably placed over the screen of the cathode ray tube 1. The map may be adjusted by rollers 17, 19 in order that the portion of the map corresponding to the desired course 21 to Camden coincides with the fluorescent screen of the tube 1. The rotating beam transmitters A' and B' are assumed to be respectively located at Washington and Harrisburg, therefore the cathode ray is focused at points 23, 25 corresponding to Washington and Harrisburg on the map 15.

The transmitters operate on different frequencies but the rotation of their beams may be synchronized by a land wire connection 27. If desired the transmitter A at Washington may include a reference mark 29 which corresponds to a line through Camden. The intersection 31 of the lines 33, 35 corresponds to the location of an airplane carrying the device. The intersection 31 indicates that the airplane is to the north or west of the desired course 21.

As the vehicle carrying the receiver proceeds, it will pass beyond the effective range of the transmitters, and beyond the portion of the map 15 coinciding with the tube 1. The map may be moved to a new position, and the cathode ray focusing means adjusted to focus the ray on new centers corresponding to the map locations of the next pair of beam transmitters. These transmitters are operated on different frequencies than the first pair of transmitters to thereby avoid interference. The map adjusting means 17 may be geared to a switch 37 which controls means for tuning the receiving device to the frequencies of the transmitters.

One suitable receiving circuit for practicing my invention is represented by the schematic diagram of Fig. 4. An antenna 41 and a ground 43 are connected to a radio frequency amplifier 45 which is tuned to respond to currents of the frequency of both pairs of beam transmitters. The output circuit of the amplifier 45 is connected to a first detector and local oscillator 47. The output circuit of the first detector is connected to the input circuits of a first intermediate frequency amplifier 49 and a second intermediate frequency amplifier 51. The amplifiers 49, 51 are respectively coupled to second detectors and audio amplifiers 53, 55. The audio amplifier output circuits are connected to the brushes 57, 59 of a commutator 61.

The commutator 61 is driven by a motor 63 which also drives commutators 65, 67. The brushes of these commutators 65, 67 are connected to suitable centering potentiometers 69. A battery 71 is connected across the potentiometers 69. A point 73 intermediate the terminals of the battery 71 is connected to the common terminal of a set of centering coils 73. The other terminals of the centering coils 73 are connected to the commutators 65, 67. In place of a motor driven commutator, electron tubes may be used for commutation. The entire problem of commutation may be avoided by simultaneous reception of the two beams and by impressing the received signals on a cathode ray tube having a dual source of cathode rays and controls therefor as shown in Fig. 5.

The synchronizing signals from the transmitters are obtained by interrupting the broadcast carrier. The resultant negative impulse from the second detector is impressed through the commutator 61 on an amplifier 75. The output of the amplifier 75 is therefore a positive impulse which is applied to a multivibrator 77. The multivibrator includes the usual anode current source 76. The theory of operation of a multivibrator is well known to those skilled in the art. In the present arrangement the frequency of oscillation of the multivibrator is determined by the frequency of the synchronizing signals. The multivibrator is thus synchronized with the synchronizing impulses from the rotating beam transmitter. The impulse derived from the intersection of the beam and the receiver is of an opposite polarity to the synchronizing impulse, and thus does not interfere with the synchronizing. The multivibrator output is applied to a filter network 79. The filter is terminated by a potentiometer 81. The slider of the potentiometer 81 is connected to an amplifier 83. The output of the amplifier 83 includes a transformer 85. The transformer is connected to inductors 87 and capacitors 89. The inductors 87 and capacitors 89 terminate in potenliometers 91, 93 which include sliders for adjusting the voltages for controlling the rotating of the cathode rays of cathode ray tube 95. The sliders are connected through series resistors to the deflecting electrodes 97 of the cathode ray tube.

The cathode, heater, and first and second anodes of the tube 95 are connected to a suitable power source not shown. The grid electrode 99 of tube 95 is connected through a biasing battery 101 to the secondary of transformer 103. The primary of the transformer is connected to a potentiometer 105 which is connected through a series capacitor 107 to the commutator 61.

When a north marking indication is used it is desirable that it consist of a positive impulse or instantaneous increase in the intensity of the broadcast carrier. It will not interfere with the synchronizing impulses because, like the impulse derived from the rotating beam, it will have an opposite polarity. The marking impulse, however, preferably has a lower intensity than that of the beam in order to permit a discrimination between the two, and therefore to make a distinction between the marking impulse indication on the cathode ray and the indication produced by the rotating beams.

The bias on the grid electrode 99 is preferably of such value that the cathode ray beam is normally biased off. The positive impulse due to the course marker, and the larger impulse of the same polarity due to the rotating beam, are both of sufficient amplitude to overcome the normal bias and cause the cathode ray trace to appear during the instant the ray traverses the paths 7, 9, and during the instant the marker signal is sent.

The commutator 61 is also connected through capacitors 109, 111 to the grids of thermionic tubes 113 and 115. The anodes of tubes 113 are respectively connected to the deflecting electrodes 97. The cathodes of tubes 115 are connected to the deflecting electrodes 97. The grid electrodes of tubes 113 and 115 are biased below cut off by batteries 117 and 119. The bias potentials of the batteries 117 and 119 are preferably less than the value of the positive impulse resulting from the rotating beam, but greater than the positive marking impulse. In such case, the marking impulse will appear as a bright spot on the cathode ray screen. The several tubes 113, 115 and their associated circuits are normally inactive and are used to momentarily deflect the cathode ray from its circular path along a radial path to the focus centers A and B (see Fig. 1) as will be hereinafter described.

The operation of the system will be described with reference to Figs. 2 and 4. The transmitters each radiate a rotating beam, and a fixed field which is modulated by synchronizing impulses, one of which may be made to coincide with the beam position of north or any suitable reference point. The signals from the pair of beam transmitters are received by antenna 41 and amplified by amplifier 45, which is tuned broadly enough to respond to currents of the different frequencies of the two beam transmitters. The first detector and local oscillator 47 heterodyne the received signals which are selectively amplified by the first and second intermediate frequency amplifiers, detected, and further amplified at audio frequency. The audio frequency output includes the positive impulse signals corresponding to the received beams, the negative synchronizing impulse and the positive course marking signal, if one is used. The synchronizing impulse is amplified by amplifier 75 and the amplified impulse controls the frequency of the relaxation oscillator 77.

The output of the relaxation oscillator is filtered to derive a sinusoidal current. The sinusoidal current may be amplified and, after such amplification, impressed on the phasing inductors 87 and capacitors 89 to thereby derive potentials of two phases for producing a rotating field for rotating the cathode rays. The derived potentials are applied to the deflecting electrodes 97 which rotate the cathode ray in synchronism with the rotating beams of the transmitting stations.

It is assumed that the transmitter locations are known, as, for example, Washington and Harrisburg, so that, in the absence of deflecting electrode potentials, the rays are initially centered or focused (by the centering potentiometers 69) on the points 23, 25 which correspond to Washington and Harrisburg on the map 15. The rays alternately rotate about these centers, due to the action of the commutators 61, 65, 67 and the synchronized deflecting potentials, but leave no circular trace because the cathode beam is normally biased off by the voltage on grid 99.

When a beam signal crosses the antenna, the received impulse removes the bias from the grids of the thermionic tubes 113, 115 and permits these tubes to absorb the deflecting potentials. With the deflecting potentials absorbed, the rotations of the cathode rays are momentarily stopped and the rays are quickly returned to their centers 23, 25. At the same time the impulse is applied to the grid 99 and the cathode ray beam attains full intensity. These sudden returns leave traces 33 and 35, respectively, on the fluorescent screen of tube 1 as the rays collapse from their circular paths to the centers 23, 25 along the radial lines 33, 35. The intersection of the radial lines indicates the position of the airplane carrying the receiver with respect to the transmitters. The indication is apparently continuous and shows the position of the airplane as it proceeds along a desired course.

The two i.-f. amplifiers 49, 51 are adjusted to receive signals from two beacons operating on different frequencies which are so related to the local oscillator frequency and i.-f. frequencies that the reception is maintained with due regard for resonance. The commutator 61 switches the derived beacon signals to the cathode ray tube at a rapid rate to thereby avoid flickering. Furthermore, the frequency of switching is at a rate which is fast enough to permit alternate reception of both beacon signals.

Thus I have described a radio course indicator in which a pair of rotating beam transmitters radiate signals which control the rotation of cathode rays about centers which are made to correspond to the location of the pair of transmitters. The receiving device includes means for momentarily stopping the rotation of the cathode rays and causing them to follow radial lines to their centers of rotation when the receiving device responds to the beams. The transmitters may include a course marking signal which is indicated by the cathode ray. It should be understood that the synchronized rotation of the beams and the cathode rays may be effected by any of the well known methods of synchronization. The same is true of the course marking signals.

The indicator may be used with a cathode ray tube of the conventional single gun type with alternate control by first one then the other of the beam signals or by a cathode ray tube with dual type of control and simultaneous control and indication. The latter choice eliminates the commutation at the expense of a more complicated cathode ray tube.

While I have described the system as a course indicator for airplanes, it may be applied to any type of mobile vehicle. Furthermore, the system is adapted to continuously spot the position of an airplane with respect to a fixed position. This is done by emitting an impulse from the airplane transmitter on a regular communication channel simultaneously with the reception of the beam on the airplane. If impulses from the airplane, and from the pair of beam transmitters are received at the fixed position, the position of the airplane will be indicated with respect to the transmitters. A plurality of airplane positions may be indicated and in accordance therewith a dispatcher can direct their movements by the ordinary means of communication.

If the radio beams are made to rotate in vertical planes and if the transmitters are suitably located with respect to a landing field, the system may be used for instrument landings. With both horizontal and vertical indicators the aircraft pilot will have complete information available as to the location and altitude of his craft.

I claim as my invention:

1. A radio course indicator including in combination a cathode ray tube which includes a cathode ray generator and a fluorescent screen, means for focusing said ray at points on said screen corresponding to the locations of a pair of rotating beam transmitters, means for receiving said rotating beams, means for rotating said ray about said points in synchronism with the rotation of respective rotating beams, and means for moving said ray towards said points in response to respective rotating beams crossing said receiving means.

2. A radio course indicator including in combination a radio receiver responsive to currents established by the beams from a pair of rotating beam transmitters, a tube which includes a cathode ray generator and a fluorescent screen, a map on which said cathode ray screen is visible, means for alternately focusing said ray at points on said map corresponding to the locations of said transmitters, means for alternately rotating said ray about said points in synchronism with the rotation of respective beams about said transmitters, and means for causing said ray to momentarily stop rotating and trace a path to said points in response to respective beams actuating said receiver.

3. A radio course indicator including in combination a pair of transmitters each of which radiates a rotating radio beam, a tube which includes a cathode ray generator and a fluorescent screen, means for alternately focusing said ray at points on said screen corresponding to the locations of said pair of transmitters, means for receiving said rotating beams, means for rotating said ray alternately about said points in synchronism with the rotation of respective rotating beams, and means for momentarily stopping the rotation of said ray and focusing said ray on said points in response to respective beams crossing said receiving means.

4. A radio course indicator including in combination a pair of transmitters which radiate rotating radio beams, a radio receiver responsive to currents established by the beams from said transmitters, a tube which includes a cathode ray generator and a fluorescent screen, a map through which said cathode ray screen is visible, means for focusing said ray alternately at points on said map corresponding to the locations of said transmitters, means for rotating said ray alternately about said points in synchronism with the rotation of said beams about respective transmitters, and means for causing said ray to momentarily stop rotating and trace a path to said points in response to respective beams actuating said receiver.

5. A radio course indicator including a pair of rotating radio beam transmitters, means for radiating from said transmitters a synchronizing signal, a radio receiver responsive to currents established by the interception of said rotating beams and to said synchronizing signal, a tube having a cathode ray gun and a fluorescent screen, a map on which said cathode ray is visible, means for alternately focusing said ray at points on said map corresponding to the locations of said transmitters, means synchronized by said signal for rotating said ray about each of said points, and means for causing said ray to trace radial paths to said points as a function of the receiver response to respective beams, whereby the intersection of said radial paths indicates the location of said receiver with respect to said transmitters.

6. A radio course indicator including a pair of rotating radio beam transmitters, means for radiating from said transmitters a synchronizing signal, a radio receiver responsive to currents established by the interception of said beams and to said synchronizing signal, a tube which includes a cathode ray gun and a fluorescent screen, a map on which said cathode ray is visible, means for alternately focusing said ray at points on said map corresponding to the locations of said transmitters, means synchronized by said signal for alternately rotating said ray about each of said points, and means for causing said ray to trace radial paths to said points as a function of the receiver response to respective beams, whereby the intersection of said radial paths indicates the location of said receiver with respect to said transmitters.

7. In a device of the character of claim 2, means for including a course marking signal in the waves radiated by said transmitters, and means for indicating said course marking signal on said cathode ray tube.

8. In a device of the character of claim 4, means for including a course marking signal in the waves radiated by said transmitters, and means for indicating said course marking signal on said cathode ray tube.

9. A radio course indicator including a pair of rotating radio beam transmitters, means for radiating from said transmitters a synchronizing signal, a radio receiver responsive to currents established by the interception of said beams and to said synchronizing signal, a cathode ray tube including dual cathode ray emitting and controlling electrodes whereby a pair of rays may be established and controlled, a map on which said cathode rays are visible, means for respectively focusing said rays at points on said map corresponding to the location of said transmitters, means synchronized by said signal for rotating each of said rays about each of said points, and means for causing each of said rays to trace radial paths to each of said points as a function of the receiver response to said beams, whereby the intersection of said radial paths indicates the location of said receiver with respect to said transmitters.

10. The method of continuously indicating the position of a vehicle carrying a radio receiver and a cathode ray tube including a cathode ray gun and a fluorescent screen which comprises, radiating a pair of rotating radio beams from known locations, causing said cathode ray to focus alternately on points on said screen corresponding to said locations, rotating said ray about said points in synchronism with said beam rotations, and momentarily stopping said ray rotations and causing said ray to trace substantially radial paths to said points as a function of the receiver response to said beams.

11. The method of continuously indicating the position on a chart of a vehicle carrying a radio receiver and a cathode ray tube for indicating said position on said chart which comprises radiating a pair of rotating radio beams from known locations, focusing said cathode ray on points on said chart corresponding to said locations, rotating said ray about said points in synchronism with said beam rotations, and momentarily stopping the rotation of said ray and causing said ray to trace paths from the circumference of said rotation toward said points in response to the receiver response to respective beams, whereby the intersection of said paths indicates the position of said vehicle on said chart.

12. The method of continuously indicating the position on a map of a vehicle carrying a radio receiver and a cathode ray tube for indicating said position on said map which comprises radiating a pair of rotating radio beams from known locations, alternately focusing said cathode ray on points on said map corresponding to said locations, alternately rotating said ray about said points in synchronism with said beam rotations, and alternately momentarily stopping the rotation of said ray and causing said ray to trace radial paths to said points in response to the receiver response to respective beams, whereby the intersection of said radial paths indicates the position of said vehicle on said map.

13. The method of continuously indicating the position on a map of a vehicle carrying a radio receiver and a cathode ray tube including dual ray emitting and ray controlling electrodes for indicating said position on said map which comprises radiating a pair of rotating radio beams from known locations, respectively focusing said cathode rays on points on said map corresponding to said locations, rotating each of said rays about said points in synchronism with said beam rotations, and momentarily stopping the rotation of each of said rays and causing each of said rays to trace radial paths to said points in response to the receiver response to said beams, whereby the intersection of said rays indicates the position of said vehicle on said map.

VLADIMIR K. ZWORYKIN.